Oct. 27, 1964    J. N. DUPREE ETAL    3,154,251
PANEL LIGHT
Filed April 16, 1962    2 Sheets-Sheet 1
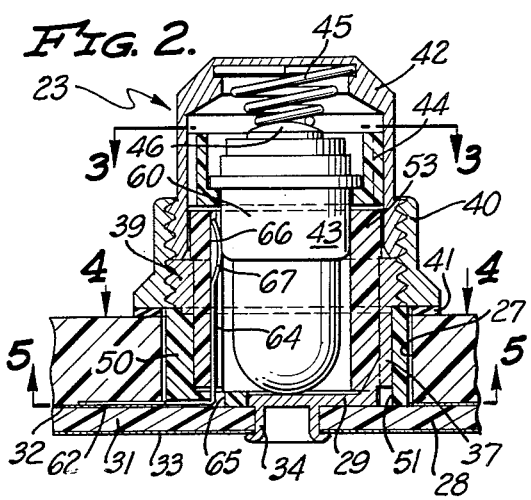
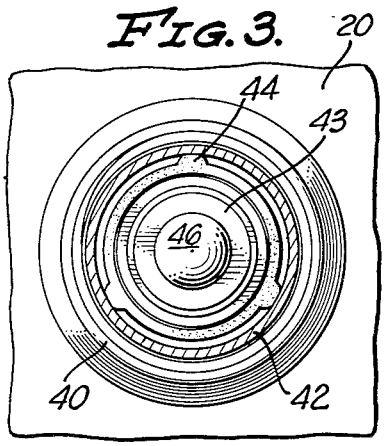
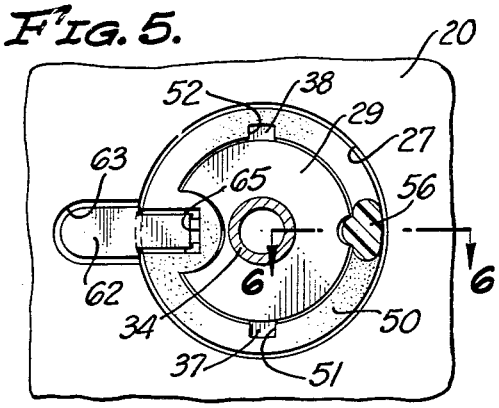
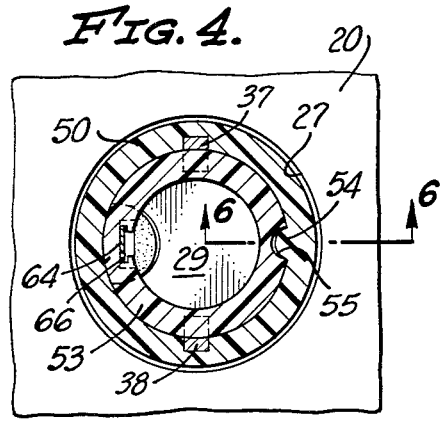
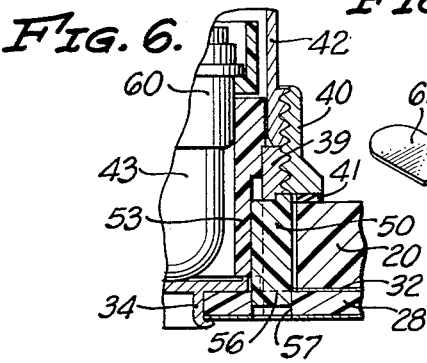
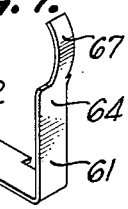
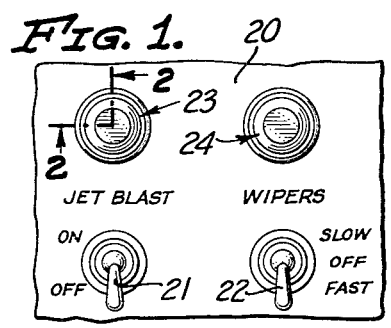
INVENTORS.
JAMES N. DUPREE,
RICHARD MATHIEU
BY THEIR ATTORNEYS
HARRIS, KIECH, RUSSELL & KERN

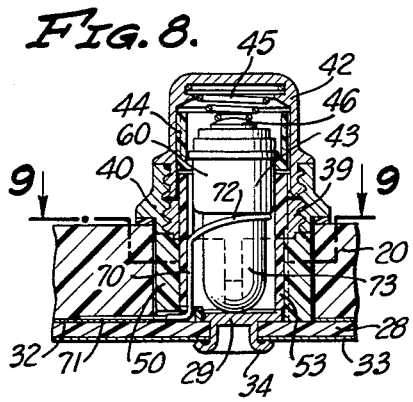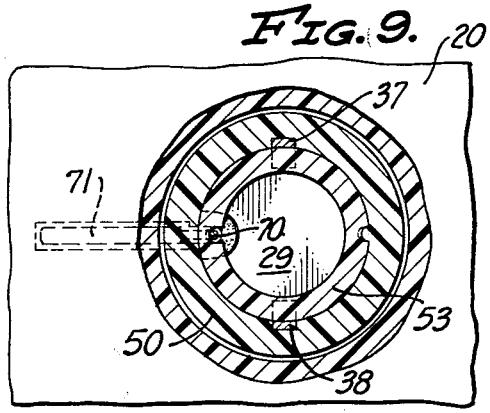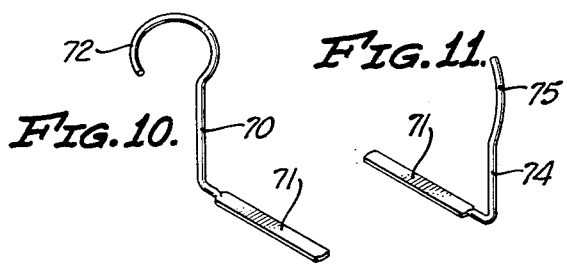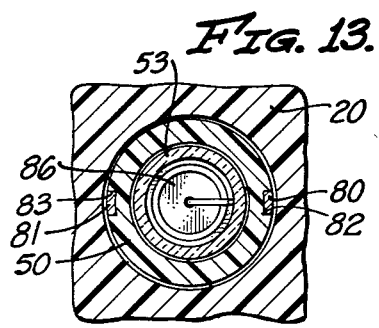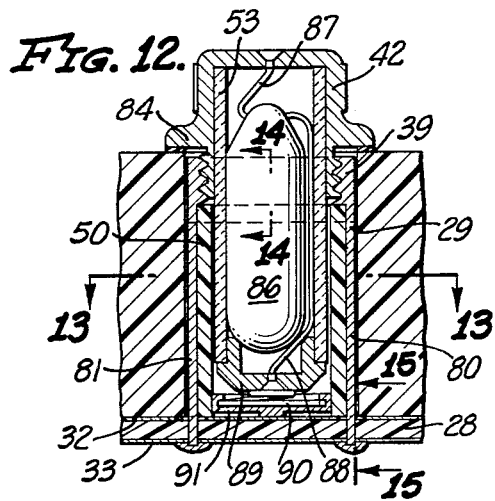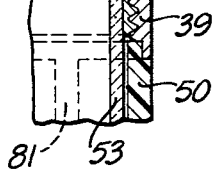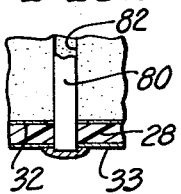
INVENTORS.
JAMES N. DUPREE,
RICHARD MATHIEU
BY THEIR ATTORNEYS
HARRIS, KIECH, RUSSELL & KERN

United States Patent Office 3,154,251
Patented Oct. 27, 1964

3,154,251
PANEL LIGHT
James N. Dupree, South El Monte, and Richard Mathieu, North Hollywood, Calif., assignors to Airmark Plastics Corp., North Hollywood, Calif., a corporation of California
Filed Apr. 16, 1962, Ser. No. 187,613
3 Claims. (Cl. 240—8.16)

This invention relates to panel lighting and, in particular, to a new and improved light for an edge-lighted panel.

Edge-lighted panels are used extensively at the present time, particularly in aircraft cockpits to provide identification of instruments and controls both day and night. A typical edge-lighted panel will comprise a sheet of transparent material, such as a clear plastic, in the order of three-sixteenths to one-half inch thick. Openings are provided in the panel for mounting instruments, controls, switches, and the like. The face side of the panel will have a coating of white, covered by an opaque coating, usually black. The desired legends appear as white letters through an appropriate pattern in the opaque coating under daytime viewing conditions. Sources of light are positioned within the panel, with the light being diffused through the panel and causing the legends to glow faintly when the cockpit is dark. For a small panel, lamps may be positioned at the edge of the panel. However, for larger panels, lamps are ordinarily positioned at various points across the panel to provide a uniform light distribution through the panel. The present application is directed to a new and novel light for use with such an edge-lighted panel.

It is an object of the present invention to provide a new and improved panel light which is small and compact, occupying a very small portion of the panel face. A further object is to provide such a panel light in which the lamp is easily changed and in which the color and intensity of the illumination is easily varied.

It is an object of the invention to provide a new and improved panel light which is rugged, dependable and suitable for extended use in various environments such as are encountered in operational aircraft. A particular object is to provide a panel light in which the lamp power circuit is separate from the panel so that structural failures, cracks, and the like, in the panel do not affect the power circuit. Another object it to provide a panel light in which the conductors for the power circuit are large sheets, eliminating the problems of routing of conductors through a maze of components and the problem of small cross sections at congested locations. It is an object of the invention to provide a new and improved panel light which may utilize none, one or two filters for control of light color and/or intensity. A further object is to provide such a light which may use a lamp with a base or a lamp with leads.

It is an object of the invention to provide a light for an edge-lighted panel having an opening therethrough for receiving a light, including a conductor plate comprising an insulating sheet having a first conductive layer extending over one face and a second conductive layer extending over the other face, the plate including at least one opening for receiving the mounting boss of the lamp retainer, with the first conductive layer recessed from the plate opening, a conductive retainer carried on the plate on one face with a mounting boss passing through the plate opening and electrically contacting the second layer, with the retainer being adapted for positioning in the panel opening, a cap unit including means for mounting the cap unit on the retainer and means for clamping the panel against the plate, a lamp carried in the cap unit and having two terminals, means for connecting one terminal of the lamp to the cap unit providing an electrical circuit through the cap unit and container to the second layer, and means for connecting the other terminal of the lamp to the first layer.

The invention also comprises novel details of construction and novel combinations and arrangements of parts, together with other objects, advantages, features and results, which will more fully appear in the course of the following description. The drawings merely show and the description merely describes preferred embodiments of the present invention which are given by way of illustration or example.

In the drawings:

FIG. 1 is a face view of a portion of an edge-lighted panel carrying two panel lights;

FIG. 2 is an enlarged sectional view taken along the line 2—2 of FIG. 1;

FIGS. 3, 4 and 5 are sectional views taken along the lines 3—3, 4—4, and 5—5, respectively, of FIG. 2;

FIG. 6 is a partial sectional view taken along the line 6—6 of FIGS. 4 and 5;

FIG. 7 is a perspective view of a contact terminal of the light of FIG. 2;

FIG. 8 is a sectional view of an alternative form of the light of the invention;

FIG. 9 is a sectional view taken along the line 9—9 of FIG. 8;

FIGS. 10 and 11 are perspective views of alternative forms of a contact for the light of FIG. 8;

FIG. 12 is a sectional view of another alternative form of the light of the invention;

FIG. 13 is a sectional view taken along the line 13—13 of FIG. 12;

FIG. 14 is a partial sectional view taken along the line 14—14 of FIG. 12; and

FIG. 15 is a partial sectional view taken along the line 15—15 of FIG. 12.

In FIG. 1, a portion of a panel 20 has switches 21, 22 and lights 23, 24 mounted therein. Legends of conventional form and relating to the functions of the switches are carried on the panel.

Referring now to FIGS. 2–5, an opening 27 is provided in the panel 20 for receiving the light 23. A conductor plate 28, ordinarily coextensive with the panel, is positioned at the back side of the panel and a retainer 29 is fixed thereto for positioning in the opening of the panel.

The conductor plate 28 comprises an insulating core 31 with conductive layers 32, 33 on the respective faces thereof. The conductor plate may be fabricated by conventional laminating techniques. For example, the layers 32, 33 may be copper foil sheets which are sealed to the core by pressure, heat or adhesive or combinations thereof. An opening is provided in the conductor plate 28 for receiving a boss 34 of the retainer 29, the end of the boss being spun over to fix the retainer to the plate. If desired, the boss may also be soldered to the layer 33 to provide a good electrical connection thereto. The retainer is insulated from the conductive layer 32, as by removing a portion of the layer around the opening in the plate or by providing an insulating washer therebetween.

The retainer 29 has a pair of parallel arms 37, 38 supporting a threaded ring 39. A clamp ring 40 threadedly engages the retainer ring 39 and clamps the panel 20 against the conductor plate 28. A washer or gasket 41 may be placed between the clamp ring and the panel. A cap 42 is threadedly mounted in the clamp ring 40. A lamp 43 is mounted in the cap 42 in a resilient grommet 44. A coil spring provides electrical contact between the cap and one terminal 46 of the lamp and also serves to prevent mechanical vibration of the lamp.

A sleeve 50 may be positioned in the opening 27 of the panel about the retainer 29 if desired. The sleeve may be of a transparent or translucent glass or plastic and can function as a light diffuser and light coloring filter. Parallel grooves 51, 52 may be formed in the sleeve 50 for receiving the corresponding arms of the retainer, with the retainer ring 39 serving to hold the sleeve 50 in position in the panel 20.

Another sleeve 53 may be slidably positioned within the arms 37, 38 of the retainer and the sleeve 50. The sleeve 53 may also be made of a transparent or translucent glass or plastic to function as a light diffuser and color control filter. This inner sleeve may be removed when the cap and lamp are removed, permitting a corresponding sleeve of a different color to be substituted therefor without dismantling the light assembly. A tongue and groove arrangement may be provided for the sleeves 50, 53 for maintaining orientation in the assembly. Referring to FIG. 4, a tongue 54 on the sleeve 50 may engage a groove 55 on the sleeve 53. Also, a boss 56 may be provided on the outer sleeve 50 for entering an opening 57 in the conductor plate 28 for orienting the sleeve relative to the plate (FIGS. 5 and 6).

Means are also provided for connecting the other terminal 60 of the lamp 43 to the conductive layer 32. In the preferred embodiment illustrated herein, the L-shaped conductor 61 of FIG. 7 serves this purpose. A tab end 62 rests against the layer 32 and may be soldered thereto. A relieved zone 63 may be provided in the panel 20 for receiving the tab 62. The other end 64 passes through an opening 65 in the sleeve 50, through an open area of the retainer 29, and lies in a groove 66 of the sleeve 53. A resilient portion 67 projects outward from the sleeve contacting the terminal 60 of the lamp to provide the electrical connection between the terminal and the conductive layer of the plate.

In making the panel light of the invention, a plurality of the retainers with the conductor 64 and filter sleeves as desired, may be mounted on a conductor plate at appropriate locations. Then the conductor plate and the panel are assembled with the retainers passing through the openings in the panel. The clamp rings 40 are threaded onto the retainers to complete the assembly. The caps with lamps installed are screwed in place and the assembly is ready for use. Ordinarily, clearance openings will be provided in the conductor plate for the switches or other equipment normally mounted on the panel. An electric power source is connected to the conductive layers of the conductor plate by conventional connecting means for energizing each of the lamps.

An alternative construction of the panel light is shown in FIGS. 8, 9 and 10, wherein parts corresponding to those of the earlier described embodiment are identified by the same reference numerals. The connection between the terminal 60 of the lamp 43 and the conductive layer 32 of the plate 28 is provided by a conductor 70 (FIG. 10). The conductor 70 has a flat tab 71 for contacting the layer 32. The other end is formed into a resilient loop 72 for positioning around the envelope 73 of the lamp and contacting the terminal 60. An alternative form for the conductor 70 is shown in FIG. 11, wherein the upright portion 74 is terminated in an arcuate section 75 which resiliently engages the terminal of the lamp.

Another alternative form of the invention is shown in FIGS. 12–15, wherein elements corresponding to those of the earlier described embodiments are identified by the same reference numerals. The retainer 29 includes parallel arms 80, 81 which pass through corresponding openings in the conductor plate 28, with the ends of the arms functioning as bosses by which the retainer is both electrically and mechanically connected to the conductor plate. As shown in detail in FIG. 15, the end of an arm projects past the conductive layer 33 and is soldered thereto to provide the mechanical and electrical connection. The outer sleeve 50 is positioned within the retainer 29 and includes grooves 82, 83 for receiving the arms 80, 81, respectively. The sleeve 50 also serves as a spacer for positioning the retainer on the conductor plate. The threads of the conductor ring 39 are turned inwardly for directly engaging the cap 42, the cap having a flange 84 for clamping the panel and conductor plate together.

The sleeve 53 is fitted in the cap 42 and a lamp 86 with leads 87, 88 is mounted in the sleeve and is held in place by a cover 89. The lead 87 is soldered to the cap 42 and the lead 88 is soldered to the cover 89. A spring 90 is mounted in a spring retainer plate 91 and is positioned within the sleeve 50 between the lamp cover 89 and the conductive layer 32 to complete the electrical circuit. As in the earlier described embodiments, the layer 32 is recessed back from the openings in the conductor plate 28 permitting the conducting arms or bosses of the retainer to make connection with the other conductive layer 33.

The embodiment of FIG. 12 has the advantage of eliminating the space required for the socket of the lamp and thereby permits a smaller diameter installation with a shorter projection from the face of the panel. Normally, the cap, inner sleeve and lamp will be replaced when a lamp burns out. Of course, the cap, sleeve and cover could be used again by utilizing a soldering iron to replace a lamp in the unit.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a light for an edge-lighted panel having an opening therethrough for receiving the light, the combination of:

a conductor plate comprising an insulating sheet having a first conductive layer on one face and a second conductive layer on the other face, said plate including at least one opening for receiving the mounting boss of a lamp retainer, with said first conductive layer recessed from said plate opening;

a conductive retainer carried on said plate on said one face with a mounting boss passing through said plate opening and electrically contacting said second layer, said retainer being adapted for positioning in the panel opening;

an outer tubular light filter clamped in place against said plate by said retainer;

an inner tubular light filter slidable within said retainer and outer filter;

a cap unit, including means mounting said cap unit on said retainer and means clamping the panel against said plate;

a lamp carried in said cap unit and having two terminals;

means connecting one terminal of said lamp to said cap unit providing an electrical circuit through said cap unit and retainer to said second layer; and means connecting the other terminal of said lamp to said first layer.

2. In a light for an edge-lighted panel having an opening therethrough for receiving the light, the combination of:

a conductor plate comprising an insulating sheet having a first conductive layer extending over one face and a second conductive layer extending over the other face, said plate including at least one opening for receiving the mounting boss of a lamp retainer, with said first conductive layer recessed from said plate opening;

a conductive retainer carried on said plate on said one face and including a mounting boss passing through said plate opening and electrically contracting said second layer, and including a coupling ring spaced from said plate on a pair of parallel arms, said retainer being adapted for positioning in the panel opening with said plate adjacent the back face of the panel and said coupling ring adjacent the front face thereof;

an outer tubular light filter clamped in place against said plate by said retainer and having parallel grooves therein for receiving said retainer arms;

an inner tubular light filter slidable within said retainer and outer filter;

a cap unit, including means coupling said cap unit to said retainer coupling ring and means clamping the panel against said plate;

a lamp carried in said cap unit and having two terminals;

means connecting one terminal of said lamp to said cap unit providing an electrical circuit through said cap unit and retainer to said second layer; and means for connecting the other terminal of said lamp to said first layer.

3. In a light for an edge-lighted panel having an opening therethrough for receiving the light, the combination of:

a conductor plate comprising an insulating sheet having a first conductive layer extending over one face and a second conductive layer extending over the other face, said plate including at least one opening for receiving the mounting boss of a lamp retainer, with said first conductive layer recessed from said plate opening;

a conductive retainer carried on said plate on said one face and including a mounting boss passing through said plate opening and electrically contacting said second layer, and including a coupling ring spaced from said plate on a pair of parallel arms, said retainer being adapted for positioning in the panel opening with said plate adjacent the back face of the panel and said coupling ring adjacent the front face thereof;

an outer tubular light filter clamped in place against said plate by said retainer and having parallel grooves therein for receiving said retainer arms;

a cap unit, including means mounting said cap unit on said retainer and means clamping the panel against said plate;

an inner tubular light filter carried in said cap unit for positioning within the panel opening and within said outer filter;

a lamp carried in said inner filter and having two terminals;

means connecting one terminal of said lamp to said cap unit providing an electrical circuit through said cap unit and retainer to said second layer; and means connecting the other terminal of said lamp to said first layer.

References Cited in the file of this patent
UNITED STATES PATENTS

| | | |
|---|---|---|
| 2,172,765 | Kollsman | Sept. 12, 1939 |
| 2,202,155 | Kollsman | May 28, 1940 |
| 2,518,726 | Shlenker | Aug. 15, 1950 |
| 2,824,954 | Roper | Feb. 25, 1958 |
| 2,860,234 | Stevens | Nov. 11, 1958 |
| 2,987,695 | Peak et al. | June 6, 1961 |
| 2,991,576 | Roper | July 11, 1961 |